United States Patent [19]
Haddon et al.

[11] Patent Number: 5,674,623
[45] Date of Patent: Oct. 7, 1997

[54] PHOTOCURABLE FILM ADHESIVES

[75] Inventors: Margaret Ruth Haddon, Milton Keynes; Terence James Smith, Royston, both of England

[73] Assignee: Ciba-Geigy Corporation, Tarrytown, N.Y.

[21] Appl. No.: 339,448

[22] Filed: Nov. 14, 1994

Related U.S. Application Data

[63] Continuation of Ser. No. 881,574, May 12, 1992, abandoned.

[30] Foreign Application Priority Data

May 18, 1991 [GB] United Kingdom .................. 9110783

[51] Int. Cl.$^6$ .......................... C09J 7/00; C09J 159/00; C09J 163/10; C09J 167/07
[52] U.S. Cl. .................. 428/414; 428/423.7; 428/424.6; 522/92; 522/93; 522/107; 522/101; 522/111
[58] Field of Search .............................. 522/96, 101, 109, 522/110, 111, 92, 93, 107, 116, 120; 428/414, 423.7, 424.6

[56] References Cited

U.S. PATENT DOCUMENTS

| | | | |
|---|---|---|---|
| 2,819,248 | 1/1958 | Casebolt | 260/45.4 |
| 4,194,955 | 3/1980 | Nowak et al. | 428/436 |
| 4,228,232 | 10/1980 | Rousseau | 522/96 |
| 4,389,472 | 6/1983 | Neuhans et al. | 430/10 |
| 4,414,275 | 11/1983 | Woods | 522/120 |
| 4,722,947 | 2/1988 | Thanawalla et al. | 522/120 |

FOREIGN PATENT DOCUMENTS

| | | |
|---|---|---|
| 1267478 | 4/1990 | Canada . |
| 0273012 | 6/1988 | European Pat. Off. . |
| 0348349 | 12/1989 | European Pat. Off. . |
| 0375609 | 6/1990 | European Pat. Off. . |
| 0423713 | 4/1991 | European Pat. Off. . |

OTHER PUBLICATIONS

Derwent Abstract of DE2607955-A, AN: 77-63257Y/36 Sep., 1977.
Derwent Abst. 87-133662/19 (1987).
Derwent Abst. 86-322303/49 (1986).
Derwent Abst. 38080 E/19 (1982).
Derwent Abst 91-152485/21 (1991).
Derwent Abst. 88-294864/42 (1988).
Derwent Abst. 90-362946/49 (1990).

*Primary Examiner*—Susan W. Berman
*Attorney, Agent, or Firm*—David R. Crichton; William A. Teoli

[57] ABSTRACT

A solid photocurable film adhesive comprising (I) a photocurable material having, on average, more than one acrylic group per molecule, at least 20% by weight of said material being a urethane acrylate, a polyester acrylate or a mixture of a urethane acrylate and a polyester acrylate, (II) as sole or major solid film-forming component, a solid polyvinylacetal and (III) a photoinitiator for photopolymerisation of acrylic compounds.

The film adhesive is useful in the production of data-carrying laminates such as identity cards.

24 Claims, No Drawings

PHOTOCURABLE FILM ADHESIVES

This application is a continuation of application Ser. No. 07/881,574, filed May 12, 1992, now abandoned.

This invention relates to adhesives for use in the production of data-carrying laminates, for example security cards, such as identity cards, credit cards or access control cards, or laminated passport photographs, and to data-carrying laminates produced using such adhesives.

Security cards such as identity cards and credit cards conventionally comprise a data-carrying sheet of, for example, paper or card, protected by a layer of a transparent plastics material. The latter is usually applied to the data-carrying sheet by a laminating process. It has been proposed to replace the conventional data-carrying sheet, for example a conventional photographic print carrying the data, such as a picture of the card holder, in a gelatin surface layer, by a sheet of non-gelatin material such as polyester film bearing a computer-processed image generated by a video camera and printed in ink on the data-carrying sheet. Conventional methods of bonding the data-carrying sheet to the protective plastics sheet rely on the use of a hot melt adhesive. These methods have not proved satisfactory with video-imaged polyester film, because hot melt adhesives give rise to discolouration or fading of printing inks used in the production of the image-carrying polyester film and because the image-carrying film and the protective plastics sheet can often be separated without destroying the image.

In EP-A-0273012, EP-A-0287516, EP-A-0348349 and EP-A-0375609, it has been proposed to bond components of security cards using various photocurable adhesives. These adhesives are generally less suitable for use with non-gelatin data-carrying sheets such as video imaged-polyester film, tending to give rise to bonds of lower strength and smudging of printing inks. It has now been found that effective bonding between such data-carrying sheets and protective plastics sheets in a security card can be obtained by use of a photocurable solid film adhesive comprising a photocurable urethane acrylate or polyester acrylate and a polyvinylacetal, such that the bonded layers of the card cannot be separated without destroying the image. Furthermore, effective bonds can be formed without smudging of, or discolouration of, printing inks used in printing the image.

Accordingly, the present invention provides in one aspect a solid photocurable film adhesive comprising (I) a photocurable material having, on average, more than one acrylic group per molecule, at least 20% by weight of said material being a urethane acrylate, a polyester acrylate or a mixture of a urethane acrylate and a polyester acrylate, (II) as sole or major solid film-forming component, a solid polyvinylacetal and (III) a photoinitiator for photopolymerisation of acrylic compounds.

In another aspect, the present invention also provides a data-carrying laminate comprising (A) a data-carrying sheet of paper or thermoplastic polymeric material bonded to (B) a transparent protective plastics sheet by a film adhesive of the invention as hereinbefore defined photocured between and in contact with (A) and (B).

The urethane acrylate used as part or all of the photocurable component (I) may be an aliphatic, cycloaliphatic or aromatic urethane acrylate. In general, better results are obtained with aliphatic and cycloaliphatic urethane acrylates. The urethane acrylate may be a reaction product of a polyisocyanate, i.e. a material having, on average, more than one isocyanate group per molecule, with a substance having at least one hydroxyl group and at least one polymerisable acrylic group. For example, it may be a reaction product of an aliphatic or cycloaliphatic diisocyanate and an adduct of an epoxide resin, such as 1,4-butanediol diglycidyl ether, with acrylic acid or methacrylic acid. Alternatively, the urethane acrylate may be a reaction product of a polyol, i.e. a material having, on average, more than one hydroxyl group per molecule, with a substance having at least one isocyanate group and at least one polymerisable acrylic group; for instance, it may be a reaction product of a polyoxyalkylene glycol with 2-isocyanatoethyl methacrylate.

A preferred class of urethane acrylate is a reaction product of an isocyanate-terminated polyurethane prepolymer with a hydroxyl group—containing acrylic compound. Isocyanate-terminated polyurethane prepolymers are available commercially or may be obtained by well established procedures. They may be prepared, for example, by reaction of a polyol, such as a hydroxy-terminated polyether or polyester, with a stoichiometric excess of a polyisocyanate.

A preferred isocyanate-terminated prepolymer is a reaction product of a polyoxyalkylene glycol with a diisocyanate. Suitable polyoxyalkylene glycols include polyoxyethylene glycols, polyoxypropylene glycols, polyoxytetramethylene glycols, polyoxyalkylene glycols obtained by reacting diols such as 1,4-butanediol, neopentyl glycol or 1,6-hexanediol with ethylene oxide or propylene oxide, and mixes of two or more thereof; polyoxyethylene glycols and polyoxypropylene glycols are preferred, especially those having a molecular weight of 1000 or more.

The diisocyanate reacted with the polyoxyalkylene glycol may be an aliphatic diisocyanate such as 1,2-propylene-, 1,3-propylene,-1, 2-butylene-, 1,4-butylene-, pentamethylene-, hexamethylene-, 2,4,4-trimethylhexamethylene-, 2,2,4-trimethylhexamethylene- and dodecamethylene- diisocyanates; a cycloaliphatic diisocyanate such as 1,3-cyclohexylene- and 1,4-cyclohexylene-diisocyanates, methyl-2,4-cyclohexylenediisocyanate, methyl-2,6-cyclohexylenediisocyanate, 1,3-bis (isocyanatomethyl) cyclohexane, 1,4-bis(isocyanatomethyl) cyclohexane, 3-isocyanatomethyl-3,5,5-trimethylcyclohexylisocyanate (isophorone diisocyanate), and 4,4$^1$-methylenebis(cyclohexylisocyanate); or an aromatic diisocyanate such as m- and p-phenylene diisocyanates, 2,4- and 2,6- tolylenediisocyanates, 1-chloro-2,4-diisocyanatobenzene, 1,4-naphthalenediisocyanate, 4,4$^1$ diphenylmethanediisocyanate and 4,4$^1$-diphenylether diisocyanate. Mixtures of two or more of the above diisocyanates can be used. Amongst these diisocyantes, aliphatic and cycloaliphatic diisocyanates are preferred, isophorone diisocyanate being an especially preferred reactant.

The hydroxyl-containing acrylic compound reacted with the isocyanate-terminated prepolymer is preferably a hydroxyalkyl acrylate or hydroxyalkyl methacrylate such as 2-hydroxyethyl acrylate, 2-hydroxypropyl acrylate, 3-hydroxypropyl acrylate, 4-hydroxybutyl acrylate and the corresponding methacrylates. Especially preferred compounds are 2-hydroxyethyl acrylate and 2-hydroxyethyl methacrylate.

Reaction of the isocyanate-terminated prepolymer with the hydroxyl-containing acrylic compound to give the photocurable urethane acrylate may be carried out using conventional procedures, for example by heating at 30°–110° C. in an inert solvent in the presence of a polymerisation inhibitor such as hydroquinone.

Photocurable urethane acrylates of the type described above are commercially available. For example, they are available from UCB under the wade mark Ebecryl and under the designation IRR. They are also available from Ancomer under the trade mark Actocryl and under the designation LPX, from Harems under the trade mark Photomer and from Craynor under the trade mark Sartomer.

The photocurable polyester acrylate used as part or all of the photocurable component (I) may be a polyester modified after formation by a reaction to introduce, on average, more than one acrylic group per molecule. For example, the polyester acrylate may be a reaction product of a hydroxyl-terminated polyester with an acrylic compound having a hydroxyl-reactive group which is a carboxyl group, a carboxylic acid halide group or an epoxide group.

Hydroxyl-terminated polyesters which may be acrylated as hereinbefore described include reaction products of dihydric alcohols with a stoichiometric deficiency of dicarboxylic acids or their anhydrides or halides. Suitable dihydric alcohols for the preparation of such polyesters include alkylene glycols such as ethylene glycol, 1,2-propylene glycol, 1,3-propylene glycol, 1,4-butanediol, neopentyl glycol, and 1,6-hexanediol; oxyalkylene glycols such as reaction products of the above mentioned alkylene glycols or dihydric phenols with ethylene oxide or propylene oxide, diethylene glycol, triethylene glycol, higher polyoxyethylene glycols, dipropylene glycol, tripropylene glycol, higher polyoxypropylene glycols and polyoxytetramethylene glycols (polytetrahydrofurans). Suitable dicarboxylic acids and anhydrides for the preparation of such polyesters include aliphatic acids and anhydrides such as succinic acid, succinic anhydride, glutaric acid, glutaric anhydride, adipic acid, pimelic acid, suberic acid, azelaic acid, sebacic acid, maleic acid, maleic anhydride and fumaric acid; cycloaliphatic acids and anhydrides such as tetrahydrophthalic acid, hexahydrophthalic acid and their anhydrides; and aromatic acids and anhydrides such as phthalic acid, phthalic anhydride, isophthalic acid and terephthalic acid.

Other hydroxyl-terminated polyesters which may be acrylated as hereinbefore described are reaction products of polyhydric alcohols or alkylene oxides with carboxyl-terminated polyesters, which carboxyl-terminated polyesters may be reaction products of dihydric alcohols such as those hereinbefore mentioned with a stoichiometric excess of dicarboxylic acids or anhydrides such as those mentioned above or reaction products of a dicarboxylic acid or anhydride such as those mentioned above with a hydroxyl-terminated polyester derived from a dihydric alcohol and dicarboxylic acid or anhydride as described above. Suitable polyhydric alcohols for reaction with a carboxyl-terminated polyester to give a hydroxyl-terminated polyester include the dihydric alcohols mentioned above and higher functional polyhydric alcohols such as trimethylolethane, 1,1,1-trimethylolpropane, pentaerythritol, dipentaerythritol, sorbitol and adducts of such higher functional alcohols with ethylene oxide or propylene oxide. Suitable alkylene oxides for reaction with carboxyl-terminated polyesters to give hydroxyl-terminated polyesters are ethylene oxide and propylene oxide.

The hydroxyl-reactive acrylic compound reacted with the hydroxyl-terminated polyester to form a polyester acrylate may be acrylic acid, acryloyl chloride, methacrylic acid, methacryloyl chloride, glycidyl acrylate, glycidyl methacrylate, a reaction product of 1 mol of a hydroxyalkyl acrylate or a hydroxyalkyl methacrylate with 1 mol of a dicarboxylic acid anhydride or an acid halide of such a reaction product. Preferably, the hydroxyl-reactive acrylic compound is acrylic acid, methacrylic acid, acryloyl chloride or methacryloyl chloride.

The photocurable polyester acrylate may be a reaction product of a carboxyl-terminated polyester with an acrylic compound having a carboxyl-reactive group which is a hydroxyl group or an epoxide group. Suitable carboxyl-terminated polyesters include those derived from a dihydric alcohol and a stoichiometric excess of a dicarboxylic acid or anhydride as hereinbefore described. Other suitable carboxyl-terminated polyesters are reaction products of hydroxyl-terminated polyesters, such as those described above, with a polycarboxylic acid or a halide or anhydride thereof, such as the dicarboxylic acids and anhydrides mentioned above and higher functional acids and anhydrides such as trimellitic acid, pyromellitic acid, benzophenone tetracarboxylic acid and their anhydrides. The carboxyl-reactive acrylic compound which is reacted with the carboxyl-terminated polyester to form a polyester acrylate may be a hydroxyalkyl acrylate or a hydroxyalkyl methacrylate, such as 2-hydroxyethyl acrylate, 2-hydroxyethyl methacrylate, 2-hydroxypropyl acrylate, 3-hydroxypropyl acrylate, 4-hydroxybutyl acrylate, and the corresponding methacrylates, glycidyl acrylate or glycidyl methacrylate.

Examples of suitable polyester acrylates as hereinbefore described are given in U.S. Pat. No. 4,206,025, assigned to UCB. Suitable polyester acrylates are available commercially from UCB under the trade mark Ebecryl.

The urethane acrylate and/or polyester acrylate may comprise substantially all of the photocurable material (I). Where a mixture of urethane acrylate and polyester acrylate is used, the weight ratio of urethane acrylate to polyester acrylate may be from 1:99 to 99:1. Alternatively, the photocurable material (I) may comprise a mixture of the urethane acrylate and/or the polyester acrylate with a polyacrylic ester of a monomeric polyhydric alcohol, a polyacrylic ester of a polyether polyol or a polyacrylic ester of an epoxide resin. The polyacrylic ester may comprise from 0.1 to 80%, for example 5 to 75%, 10 to 75%, 20 to 75%, 30 to 75%, 40 to 75%, 50 to 75%, or 60 to 75% by weight of the mixture.

Examples of polyacrylic esters of monomeric polyhydric alcohols are polyacrylates and polymethacrylates of glycols, including alkylene glycols such as ethylene glycol, 1,2 propylene glycol, 1,3-propylene glycol, 1,4-butanediol, neopentyl glycol and 1,6-hexanediol and oxyalkylene glycols such diethylene glycol, triethylene glycol, dipropylene glycol and tripropylene glycol; and polyacrylates and polymethacrylates of higher functional alcohols such as glycerol, 1,1,1-trimethylolpropane, pentaerythritol and adducts of these alcohols with ethylene oxide or propylene oxide. Suitable polyacrylic esters of polyether polyols include polyacrylates and polymethacrylates of polyols such as polyoxyethylene glycols, polyoxypropylene glycols and polyoxytetramethylene glycols (poly tetrahydrofurans). Examples of polyacrylic esters of epoxide resins are adducts of acrylic acid or methacrylic acid with polyglycidyl ethers of polyhydric alcohols, such as the polyhydric alcohols mentioned above, or of polyhydric phenols, usually bisphenols, such as bisphenol A, or novolac resins. Polyacrylic esters of monomeric alcohols and polyacrylic esters of epoxide resins are preferred for use with the urethane acrylate and/or polyester acrylate, especially preferred polyacrylic esters being 1,4-butanediol diacrylate and diacrylic esters of advanced, particularly bisphenol A-advanced, diglycidyl ethers of bisphenol A.

In certain preferred embodiments of the invention, the photocurable acrylic material (I) comprises 100% by weight urethane acrylate, or 100% by weight polyester acrylate, or a mixture of 95 to 50%, especially 95 to 85%, by weight polyester acrylate with 5 to 50%, especially 5 to 15%, by weight urethane acrylate, or a mixture of 20 to 40%, especially 25 to 35%, by weight of urethane acrylate with 80 to 60%, especially 75 to 65%, by weight of a polyacrylic ester of a monomeric polyhydric alcohol or a mixture of 50 to 70%, especially 55 to 65%, by weight polyester acrylate with 50 to 30%, especially 45 to 35%, by weight of a polyacrylic ester of an epoxide resin.

The polyvinylacetal (II) may be, for example, a polyvinylformal, a polyvinylacetal or a polyvinylbutyral. Suitable such polymers are available commercially. Polyvinylbutyrals are preferred, especially those having a softening point of at least 150° C., e.g. in the range 150°–180° C. or at least 200° C. As indicated above, the polyvinylacetal is the sole or major solid film-forming component of the film adhesive of the invention. The amount chosen for a particular adhesive is such that the adhesive is a solid, self-supporting film. As will be apparent to those skilled in the art, this amount can vary according to the nature of the photocurable acrylic material (I), the nature of any optional ancillary components of the film adhesive and their relative amounts. Optimum amounts of a polyvinylacetal (II) for a particular adhesive can readily be determined by simple experiment In general, the polyvinylacetal may be present in amounts from 20 to 150% by weight of the photocurable acrylic material (I).

If desired, the film adhesive of the invention may also contain other solid film-forming polymers, for example olefin-vinyl ester copolymers such as ethylene-vinyl acetate copolymers, olefin-alkyl acrylate copolymers such as ethylene-ethyl acrylate copolymers, other acrylic polymers, phenoxy resins, advanced epoxide resins or (non-acrylated) polyurethanes. Preferably, the polyvinylacetal (II) comprises at least 50% by weight of the solid film-forming content of the film adhesive.

The photoiniator (III) may be any of the known initiators for the photopolymerisation of acrylic materials. Thus (III) may be an aromatic carbonyl compound, for example a benzoin, a benzoin alkyl ether such as the isopropyl or n-butyl ether, an α-substituted acetophenone, for example a benzil ketal such as benzil dimethyl ketal, an α-haloacetophenone such as trichloromethyl p-tert.butylphenyl ketone, an α-aminoacetophenone such as dimethylaminomethyl phenyl ketone, morpholinomethyl phenyl ketone and others as described in EP-A-0 003 002, EP-A-0088050, EP 0 117233 and EP-A-0138754, a dialkoxyacetophenone such as diethoxyacetophenone, or an α-hydroxy-acetophenone such as 1-hydroxycyclohexylphenyl ketone or a benzophenone such as benzophenone itself and bis(4-dimethylamino) benzophenone; a metallocene, for example a titanium metallocene such as bis(π-methylcyclopentadienyl) bis-(σ-pentafluorophenyl) titanium (IV); a Group organometallic compound, for example a stannane such as trimethyl benzyl stannane, tributyl benzyl stannane or dibutyl dibenzyl stannane, together with a photoreducible dye, typically methylene blue or rose bengal; a quinone, such as anthraquinone or camphorquinone, together with an amine having hydrogen attached to an aliphatic alpha carbon atom, preferably a tertiary amine such as bis(4-dimethylamino)-benzophenone and triethanolamine; a thioxanthone, for example an alkyl-or halogen- substituted thioxanthone such as 2-isopropylthioxanthone or 2-chlorothioxanthone; an acyl phosphine oxide; or a mixture of two or more thereof. Preferably, the photoinitiator (III) is an α-substituted acetophenone, a thioxanthone, a benzophenone or a mixture of two or more thereof. In particularly preferred embodiments, the initiator is an alpha-hydroxy substituted acetophenone, an alpha-amino substituted acetophenone or a mixture thereof with a 2-alkylthioxanthone. The photoinitiator can be used in a conventional amount, generally from 0.1 to 20%, preferably 1 to 10%, by weight of the total photopolymerisable content of the film adhesive.

A film adhesive of the invention may also contain a liquid photopolymerisable monovinyl monomer as reactive diluent. This may be helpful in reducing the viscosity of compositions from which film adhesives of the invention are produced, and may be subsequently polymerised during photocure of the adhesive. Suitable liquid photopolymerisable monovinyl monomers include vinyl esters such as vinyl acetate; monoacrylic monomers including monoacrylic esters such as alkyl acrylates and alkyl methacrylates, for example n-butyl acrylate, 2-ethylhexyl acrylate, n-octadecyl acrylate and the corresponding methacrylates, hydroxyalkyl acrylates and hydroxyalkyl methacrylates, for example 2-hydroxyethyl acrylate, 2-hydroxypropyl acrylate, 3-hydroxypropyl acrylate, 4-hydroxybutyl acrylate and the corresponding methacrylates, and cycloaliphatic monoacrylates and monomethacrylates, for example isobornyl acrylate, dicyclopentenyl acrylate and the corresponding methacrylates; N-vinyl monomers, usually N-vinyl heterocycles such as N-vinylpyrrolidone or N-vinylcaprolactam; and mixture of two or more thereof. Preferred monovinyl monomers are monoacrylic esters such as those mentioned above, N-vinyl monomers such as those mentioned above and mixtures thereof. Especially preferred monovinyl monomers are isobornyl acrylate and N-vinylpyrrolidone.

An elastomeric polymer may be included in a film adhesive of the invention as a toughening agent. Toughening elastomeric polymers are well known in the adhesives art; they include polymers of conjugated dienes such as butadiene or isoprene, which may be homopolymers or copolymers with other ethylenically unsaturated materials, usually styrene, substituted styrenes and acrylic monomers such as acrylonitrile, alkyl acrylates and alkyl methacrylates. These diene polymers may have terminal functional groups such as carboxyl or vinyl groups. Preferred elastomeric polymers are vinyl terminated butadiene-acrylonitrile copolymers, particularly those having number average molecular weights of 500 upwards.

The film adhesive of the invention may also contain other additives conventionally included in polymerisable acrylic adhesives, for example polymerisation inhibitors such as hydroquinone and 2,6-di-tert.butyl4-methylphenol, adhesion promoters such as silanes and filers, such as ground glass, which are transparent to actinic radiation.

Production of the film adhesive may be carried out using conventional procedures. In one procedure, a solution of the photocurable acrylic material (I), the polyvinylacetal (II), the photoinitiator (III) and, where present, other optional ingredients in a volatile solvent such as methanol, ethanol, isopropanol, methyl ethyl ketone or methylene chloride is applied to one or both of the surfaces to be bonded or to a release sheet such as silicone-coated paper, and the solvent is evaporated to leave a solid film of photocurable adhesive. In another procedure, the film adhesive may be formed without the use of solvents by subjecting a mixture of the ingredients to heat and pressure, for example between rollers, under conditions which do not induce polymerisation. In a further procedure, the ingredients can be heated to form a melt which is applied in liquid form to one or more of the substrates or to a release sheet and then solidified on cooling.

The amount of solvent (where used) and the amount of mixture applied to the surface to be bonded or to the release sheet may be adjusted to give a solid film adhesive of the desired thickness. This thickness may vary according to the substrates to be bonded. For most applications in bonding components of data-carrying laminates, film adhesives having a thickness of from 10 μm to 50 μm, e.g. from 20 μm to 35 μm, are generally suitable. When the film adhesive is formed on a release sheet it may be stored, for example wound in the form of a continuous roll, shielded from polymerising radiation until required, when a piece of the film may be cut to the desired dimendsions and, after removal of the adhering release sheet(s), inserted between the substrates to be bonded.

A film adhesive of the invention is useful in the production of data-carrying laminates, for example security cards such as identity cards or credit cards or laminated passport photographs. In producing such laminates, a data-carrying sheet (A) of paper or thermoplastic polymeric material is bonded to a transparent protective plastics sheet (B) by photocuring a film adhesive of the invention between, and in contact with, (A) and (B). The data carried by the sheet (A) may comprise an image of the person to whom the card is to be issued or may comprise other pictorial, graphic or alphanumerical data. The invention is particularly useful where the sheet (A) carries a video image, i.e. an image generated on videotape which has been printed on to the surface of the sheet. The data-carrying sheet (A) may be of paper, which may comprise cellulosic fibres and/or synthetic polymeric fibres such as polyester, polyamide or polyolefin fibres or may be of a thermoplastic polymeric film such as cellulose acetate, a polyester, a polyvinyl chloride or a polyamide. The invention is particularly useful where (A) is a polyester film. The protective plastics sheet (B) may be of materials conventionally used in protective layers on identity cards or credit cards, preferably of polyester or polyvinyl chloride.

In the production of a laminate according to the invention, an assembly of (A) the data-carrying sheet and (B) the protective plastics sheet, with a film adhesive of the invention between, and in contact with, (A) and (B), is subjected to actinic radiation to cure the adhesive. Prior to irradiation, the assembly is preferably subjected to pressure to remove entrapped air and heated to soften the film adhesive to ensure good contact between the adhesive and the substrates. The pressure may be hand pressure; in commercial processes, the pressure and heat are more usually applied in a laminating apparatus such as a laminator conventionally used in the production of identity cards. The actinic radiation used to effect cure of the film adhesive may be exclusively ultraviolet radiation or it may be radiation having wavelengths in both the ultraviolet and visible regions of the spectrum. Radiation having a wavelength of 200 to 800 nm especially 200 to 500 nm, is preferred. The selection, from commercially available equipment, of a suitable radiation source emitting radiation within this wavelength range is a routine matter for those skilled in the an of photocuring. Suitable sources include medium pressure mercury arc lamps and metal halide lamps. Suitable irradiation times may similarly be determined readily by those familiar with photocuring techniques.

The invention is illustrated by the following Examples, in which all parts are by weight unless indicated otherwise.

EXAMPLE 1

In methanol (90 parts) there are dissolved successively MOWITAL B 70H (a polyvinylbutyral having a softening point above 200° C. available from Hoechst) (10 parts), EBECRYL 830 (a polyester acrylate available from UCB) (30 parts) and 1-hydroxyyclohexyl phenyl ketone (1 part).

The resulting solution is applied, as a layer 75 micrometers thick, to a sheet of Melinex polyester available from ICI. The methanol is evaporated by placing the coated sheet in an oven at 50° C. for 2 minutes, to leave a photocurable solid film adhesive on the sheet.

A polyester film bearing a printed video image is applied to the film adhesive carried on the Melinex sheet. The resulting assembly is passed through a Laminex SL 2 hot roll laminatot (available from Laminex International) at 135° C. and then irradiated under a 5000 w metal halide lamp at a distance of 75 cm for 10 seconds to photocure the film adhesive and complete formation of the laminate. There is no smudging of printing ink used in printing the image. The bond between the layers of the laminate is secure; on attempting to separate the layers, the image is destroyed.

EXAMPLE 2

The procedure of Example 1 is repeated using, instead of the solution used in that Example a solution of MOWITAL B 70H (100 parts), Photomer RCP 4015 (an aliphatic urethane acrylate available from Harcros) (25 parts), EBECRYL 830 (275 parts) and 1-hyctroxycyclohexyl phenyl ketone (10 parts) in methanol (900 parts).

In the data-carrying laminate obtained, there is no smudging of printing ink used in printing the image. The bond between the layers of the laminate is secure; on attempting to separate the layers, the image is destroyed.

EXAMPLE 3

The procedure of Example 1 is repeated using, instead of the solution used in that Example, a solution of MOWITAL B 70H (100 parts), EBECRYL 270 (a urethane acrylate available from UCB which is a reaction product of hydroxyethyl acrylate and an isocyanate—terminated prepolymer from a polyoxypropylene glycol and isophorone diisocyanate) (46.4 parts), isobornyl acrylate (67.8 parts), N-vinylpyrrolidone (38.8 parts), a vinyl-terminated butadiene-acrylonitrile copolymer having a molecular weight of 1300 sold as Hycar Reactive Liquid Polymer Type 1300×22 by B.F. Goodrich Co (38.8 parts), Silane A187 (a silane adhesion promoter available from Union Carbide) (2 parts), α,α-dimethyl-α-N-morpholino-p(methylthio) acetophenone (5.8 parts) and 2-isopropylthioxanthone (0.5 part) in methanol (900 parts).

In the data-carrying laminate obtained, there is no smudging of printing ink used in printing the image. The bond between the layers of the laminate is secure; on attempting to separate the layers, the image is destroyed.

EXAMPLE 4

The procedure of Example 1 is repeated using, in place of the solution used in that Example, a solution of Mowital B 70H (100 parts), Ebecryl 270 (69.6 parts), 1,4-butanediol diacrylate (100 parts), isobornyl acrylate (101.7 parts), N-vinylpyrrolidone (58.2 parts), Hycar Reactive Liquid Polymer Type 1300×22 (58.2 parts), Silane A187 (3 parts), α,α,-dimethyl-α-N-morpholino-p(methylthio)acetophenone (8.7 parts) and 2-isopropylthioxanthone (0.7 part) in methanol (900 parts).

In the data-carrying laminate obtained, there is no smudging of printing ink used in printing the image. The bond between the layers of the laminate is secure; on attempting to separate the layers, the image is destroyed.

EXAMPLE 5

The procedure of Example 1 is repeated using, in place of the solution used in that Example, a solution of Mowital B 30 HH (a polyvinylbutyral having a softening range of 150°–170° C. available from Hoechst) (20 parts), Ebecryl 830 (15 parts), an adduct of 2 mols of acrylic acid with 1 mol of a 1:1 mixture of diglycidyl ethers of bisphenol A advanced by reaction with bisphenol A and having epoxide contents of 1.7 mol/kg and 2 mol/kg respectively (10 parts) and 1-hydroxycyclohexyl phenyl ketone (2 parts) in methyl ethyl ketone (100 parts).

In the data-carrying laminate obtained, there is no smudging of printing ink used in printing the image. The bond between the layers of the laminate is secure; on attempting to separate the layers, the image is destroyed.

What is claimed is:

1. A solid photocurable film adhesive comprising:

(I) a photocurable material having, on average, more than one acrylic group per molecule consisting essentially of a mixture of (a)(i) a urethane acrylate having, on average, more than one acrylic group per molecule which is a reaction product of an isocyanate-terminated polyurethane prepolymer with a hydroxyl group-containing acrylic compound or (II) a polyester acrylate having, on average, more than one acrylic group per molecule which is a polyester modified after formation by reaction to introduce, on average, more than one acrylic group per molecule or (III) said urethane acrylate and said polyester acrylate with (b) a polyacrylic ester of an epoxide resin, at least 20% of said photocurable material being component (a), (II) as sole or major solid film-forming component, a solid polyvinylacetal present in an amount from 20 to 150% by weight of the photocurable material (I), and (III) a photoinitiator for photopolymerisation of acrylic compounds.

2. A film adhesive according to claim 1, in which the urethane acrylate is an aliphatic or cycloaliphatic urethane acrylate.

3. A film adhesive according to claim 1, in which the prepolymer is a reaction product of a polyol with a stoichiometric excess of an aliphatic or cycloaliphatic diisocyanate.

4. A film adhesive according to claim 1, in which the hydroxyl-containing acrylic compound is a hydroxyalkyl acrylate or a hydroxyalkyl methacrylate.

5. A film adhesive according to claim 1, in which (a) is a polyester acrylate or a mixture thereof with a urethane acrylate.

6. A film adhesive according to claim 5, in which the polyester acrylate is a reaction product of a hydroxyl-terminated polyester with an acrylic compound having a hydroxyl-reactive group which is a carboxylic group, a carboxylic acid halide group or an epoxide group.

7. A film adhesive according to claim 5, in which the polyester acrylate is a reaction product of a carboxyl-terminated polyester with an acrylic compound having a hydroxyl group or an epoxide group.

8. A film adhesive according to claim 5, in which component (I) comprises substantially all of the photocurable content of the adhesive.

9. A film adhesive according to claim 5, in which the polyester acrylate is a polyester modified after formation by reaction to introduce, on average, more than one acrylic group per molecule.

10. A film adhesive according to claim 1, in which the polyacrylic ester of an epoxide resin is a diacrylic ester of an advanced diglycidyl ether of bisphenol A.

11. A film adhesive according to claim 10, in which the polyvinylacetal (II) is a polyvinylbutyral.

12. A film adhesive according to claim 1, in which the polyvinylacetal (II) is a polyvinylbutyral.

13. A film adhesive according to claim 12, in which the polyvinylbutyral has a softening point of at least 150° C.

14. A film adhesive according to claim 12, in which the polyvinylbutyral has a softening point of at least 200° C.

15. A film adhesive according to claim 1, in which the photoinitiator (III) is an alpha-substituted acetophenone, a thioxanthone, a benzophenone or a mixture of two or more thereof.

16. A film adhesive according to claim 1, which also contains a liquid photopolymerizable monovinyl monomer as reactive diluent.

17. A film adhesive according to claim 1, which also contains an elastomeric polymer as toughening agent.

18. A film adhesive according to claim 17, in which the elastomeric polymer is a vinyl-terminated butadiene-acrylonitrile copolymer.

19. A film adhesive according to claim 1 in solution in a volatile solvent.

20. A film adhesive according to claim 1, in which component (a) is a reaction product of an isocyanate-terminated polyurethane prepolymer with a hydroxyl group-containing acrylic compound or a polyester modified after formation by reaction to introduce, on average, more than one acrylic group per molecule, component (b) is a diacrylic ester of an advanced diglycidyl ether of bisphenol A and component (II) is a polyvinyl butyral.

21. A film adhesive according to claim 1, in which component (I) comprises substantially all of the photocurable content of the adhesive.

22. A film adhesive according to claim 1 consisting essentially of components (I), (II) and (III).

23. A data-carrying laminate comprising (A) a data-carrying sheet of paper or thermoplastic polymeric material bonded to (B) a transparent protective plastics sheet by a film adhesive according to claim 1 photocured between, and in contact with, (A) and (B).

24. A laminate according to claim 23, in which (A) is a polyester film and (B) is of a polyester or a polyvinyl chloride.

* * * * *